(12) United States Patent
Kilian et al.

(10) Patent No.: US 7,899,575 B2
(45) Date of Patent: Mar. 1, 2011

(54) MACHINE TOOL AND METHOD FOR PROCESSING A WORKPIECE

(75) Inventors: Friedrich Kilian, Leonberg/Gebershelm (DE); Frank Schmauder, Metzingen (DE); Dieter Pfisterer, Tamm (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 289 days.

(21) Appl. No.: 12/145,717

(22) Filed: Jun. 25, 2008

(65) Prior Publication Data
US 2009/0005898 A1    Jan. 1, 2009

(30) Foreign Application Priority Data
Jun. 30, 2007   (EP)   ................... 07012865

(51) Int. Cl.
*G06F 19/00* (2006.01)
*B23K 26/04* (2006.01)
*B23K 26/00* (2006.01)
*B23K 26/06* (2006.01)
*B21C 51/00* (2006.01)

(52) U.S. Cl. ............ 700/186; 219/121.62; 219/121.73; 219/121.82; 700/166; 700/172; 72/21.4

(58) Field of Classification Search ................ 700/166, 700/172, 186; 72/21.4; 219/121.73, 121.82, 219/121.62
See application file for complete search history.

(56) References Cited

U.S. PATENT DOCUMENTS

| | | | | |
|---|---|---|---|---|
| 3,422,246 A | * | 1/1969 | Wetzel | 219/121.67 |
| 4,135,239 A | * | 1/1979 | Hamill et al. | 700/180 |
| RE31,042 E | * | 9/1982 | Clark et al. | 219/121.67 |
| 4,469,930 A | * | 9/1984 | Takahashi | 219/121.72 |
| 4,584,649 A | * | 4/1986 | Komanduri et al. | 700/173 |

(Continued)

FOREIGN PATENT DOCUMENTS

DE   3101781   8/1982

(Continued)

OTHER PUBLICATIONS

European Search Report from corresponding European Application No. EP 07 01 2865, mailed Nov. 26, 2007, 5 pages.

(Continued)

*Primary Examiner*—Albert Decady
*Assistant Examiner*—Tom Stevens
(74) *Attorney, Agent, or Firm*—Fish & Richardson P.C.

(57) ABSTRACT

The invention relates to a machine tool for processing a plate-like workpiece, including a processing tool. The processing tool is movable relative to the workpiece and the workpiece is movable relative to the processing tool along a common movement axis. A control unit selectively actuates the processing tool and the workpiece in such a manner that in a first processing mode both the processing tool and the workpiece are moved along the common movement axis and, in a second processing mode the processing tool alone is moved along the common movement axis. The invention further relates to a method for processing a workpiece of the kind mentioned above, to a method for creating a processing program, and to a computer program product having code for performing all steps of the method for creating the processing program.

18 Claims, 2 Drawing Sheets

U.S. PATENT DOCUMENTS

| | | | | |
|---|---|---|---|---|
| 5,206,473 | A * | 4/1993 | Suzuki et al. | 219/121.83 |
| 5,304,773 | A * | 4/1994 | Kilian et al. | 219/121.78 |
| 5,359,872 | A * | 11/1994 | Nashiki | 72/16.1 |
| 5,449,881 | A * | 9/1995 | Nakata et al. | 219/121.67 |
| 5,718,832 | A * | 2/1998 | Mori | 219/121.83 |
| 5,854,751 | A * | 12/1998 | Di Pietro et al. | 700/166 |
| 6,593,541 | B1 * | 7/2003 | Herren | 219/121.67 |
| 6,643,561 | B1 * | 11/2003 | Torvinen | 700/166 |
| 6,738,679 | B2 * | 5/2004 | Fujita et al. | 700/56 |
| 6,972,393 | B2 * | 12/2005 | Nagatoshi et al. | 219/121.76 |
| 7,168,277 | B2 * | 1/2007 | Thomae et al. | 72/21.4 |
| 7,467,534 | B2 * | 12/2008 | Bytow | 72/419 |
| 7,482,776 | B2 * | 1/2009 | Scholich-Tessmann | 318/575 |
| 7,661,073 | B2 * | 2/2010 | Lausterer et al. | 715/810 |
| 2004/0112876 | A1 * | 6/2004 | Watanabe | 219/121.67 |

FOREIGN PATENT DOCUMENTS

| | | |
|---|---|---|
| JP | 61283483 | 12/1986 |
| JP | 2921727 | 4/1999 |
| JP | 2002337032 | 11/2002 |

OTHER PUBLICATIONS

Office Action from corresponding European Patent Application No. 07 012 865.7, mailed Oct. 9, 2008, 3 pages.

* cited by examiner

MACHINE TOOL AND METHOD FOR PROCESSING A WORKPIECE

CROSS REFERENCE TO RELATED APPLICATION

This application claims priority under 35 U.S.C. §119(a) from EP Application No. 07 012 865.7, filed Jun. 30, 2007, the entire contents of which are hereby incorporated by reference.

TECHNICAL FIELD

This invention relates to a machine tool for processing a plate-like workpiece, especially a metal sheet, with relative movement of the workpiece and a processing tool. The invention further relates to a method for processing a workpiece of the above kind, to a method for creating a processing program, and to a computer program for performing the method for creating the processing program.

BACKGROUND

A machine tool for processing a plate-like workpiece, with relative movement of the workpiece and a processing tool, and an associated method, are known, for example, from Japanese Patent Specification No. 2 921 727. That specification describes a laser processing machine having a laser processing head which is movable in an X and a Y direction, and a workpiece that can be moved in the X and Y direction by means of a movement unit. In this machine, the movement region of the processing head is smaller than the movement region of the workpiece. To process the workpiece, therefore, first a laser processing site of the workpiece is positioned within the movement region of the laser processing head and only then is the laser processing head moved in the X and Y direction in order to process the workpiece.

In the case of the laser processing machine described above, the area that can be processed with the laser processing head is limited to the movement region of the head. If larger areas are to be laser-processed, it is necessary first to stop laser processing and move the workpiece before processing may be continued.

SUMMARY

The present invention features a machine tool for processing a plate-like workpiece, especially a metal sheet, with relative movement of the workpiece and a processing tool, the processing tool being movable relative to the workpiece along one and the same movement axis (a "common movement axis"). The invention also features methods utilizing such a machine tool, which allow processing of the workpiece to proceed rapidly and with high reliability of the process.

In one aspect, the invention features a machine tool wherein a control unit is provided for actuating the processing tool and the workpiece in such manner that optionally, in a first processing mode, both the processing tool and the workpiece are moved along a common movement axis or, in a second processing mode, the processing tool alone is moved along the common movement axis. In the first processing mode, rapid processing of the workpiece may be performed by moving the workpiece and the processing tool along the common movement axis, with the result that, at the point of action, a kinematic superposition of the movements along the movement axis is obtained. In the second processing mode, owing to the workpiece being at rest the reliability of the process may be increased, as may be especially advantageous when the workpiece is being processed by a cutting tool. The term "processing mode" denotes in this Application an operating mode of the machine tool in which the workpiece is processed, e.g., by laser cutting. An operating mode in which the workpiece is merely being positioned for subsequent processing is not encompassed by that term.

In some embodiments, the control unit is configured to switch, during processing of the workpiece, from the first to the second processing mode before the final cutting-free of a workpiece cut-out (e.g., a part that has been cut out of the workpiece) from the workpiece. Up to the final cutting-free, cutting of the workpiece cut-out from the workpiece can be carried out in the first processing mode, with a cut slit being formed in the workpiece. Preferably, the control unit switches from the first to the second processing mode when there remains between the workpiece cut-out and the workpiece a residual connection of a sufficiently short length that further movement of the workpiece would cause relative movement of the workpiece cut-out and workpiece. As a result of the relative movement, the workpiece cut-out may pass under the workpiece and become wedged there. Furthermore, the width and shape of the cut slit may be altered as a result of the relative movement. In order to avoid this, the control unit is preferably configured in such a manner that in the final cutting-free operation, i.e., from the moment when the length of the residual connection is too small to prevent relative movement, the control unit switches over to the second processing mode.

In one advantageous development, a suction device is provided for applying suction to the workpiece in the second processing mode. By the application of suction, the workpiece may additionally be fixed in position.

In some embodiments, a workpiece table is provided for movement of the workpiece. The workpiece table is used in this case as a movement unit for the workpiece. The workpiece table is movable, for example by a conventional coordinate guide in one direction or in two directions relative to a stationary support on the machine tool. In cases where the workpiece table is moved in only one direction, a movable holding device for the workpiece may be provided for movement of the workpiece in a second direction. This further movement unit makes possible relative movement of the workpiece with respect to the workpiece table in the second direction.

In some embodiments, an aperture for the removal of cut-off workpiece cut-outs is provided in the workpiece table. Through the aperture, the cut-off parts can rapidly be removed from the working region of the machine tool by gravity.

In an advantageous manner, the aperture is closable by at least one movable element, preferably a flap. The flap is generally opened only after a workpiece cut-out that is resting thereon has been completely cut free.

In a particularly advantageous embodiment, the processing tool is a laser processing head which is generally disposed above the workpiece and is movable in at least two directions. The laser processing head makes it possible for the metal sheet to be cut rapidly with an even cut slit being formed.

Preferably, the control unit is configured so that selectively, in a third processing mode, the workpiece alone is moved. Movement of the workpiece alone may be advantageous, for example, when straight-line cuts of a length extending beyond the movement region of the processing tool are being made. In this case also, before the final cutting-free operation, a switch is made from the third to the second processing mode in order to avoid movement of the workpiece during the final cut.

In a further advantageous embodiment, a movement region of the processing tool is smaller than a movement region of the workpiece. The laser processing head is able to execute movements within its relatively small movement region with high acceleration whereas the workpiece, although capable of being moved over a larger movement region, can be accelerated more slowly than the laser processing head because of its greater inertia. Owing to the superposed movement of processing tool and workpiece, the two movements may advantageously be combined.

The invention also features a method for processing a plate-like workpiece, e.g., a metal sheet, with relative movement of the workpiece and a processing tool, the processing tool being movable relative to the workpiece and the workpiece being movable relative to the processing tool along one a common movement axis. The processing tool and the workpiece are actuated in such a manner that the processing of the workpiece takes place selectively in a first processing mode, in which both the processing tool and the workpiece are moved along the common movement axis, or in a second processing mode, in which the processing tool alone is moved along the common movement axis. Using the method according to the invention, a machine tool can be operated in such a way that rapid and reliable processing of the workpiece is made possible. It will be appreciated that in the first and/or in the second processing mode the processing tool and/or the workpiece may additionally also be moved along a second common movement axis, that is to say, the relative movement does not necessarily have to take place along a straight-line path. Nor does the movement axis (or do multiple axes) necessarily have to coincide with the X and Y axes of a machine tool, that is to say, the common movement axis or axes may, in particular, form an angle with those axes.

As discussed above, in some implementations a switch is made from the first to the second processing mode before final cutting-free of a workpiece cut-out from the workpiece, whereby differential movement between the workpiece cut-out and workpiece during the final cutting-free operation (final cut) can be avoided.

In a further advantageous variant, the workpiece cut-out is finally cut free from the workpiece in the second processing mode at a residual connection which has been left after formation of a cut slit between the workpiece cut-out and workpiece in the first processing mode. In this case, the workpiece is processed in the first processing mode until the residual connection is too short for differential movement between workpiece and workpiece cut-out to be avoided.

In a preferred variant, a switch is made from the first to the second processing mode as soon as the length of the residual connection becomes less than 40 mm. Below that length, the differential movement described above can typically no longer be avoided when the metal sheet is being processed in the first processing mode, in which both the workpiece and the tool are moved. The length of the residual connection may, however, vary between 30 and 50 mm, and even between 20 and 60 mm, depending on the type of machine tool and the workpiece or metal sheet being processed.

In a further especially preferred variant, before the final cutting-free operation, the workpiece is preferably fixed in position by the application of suction, which additionally increases the reliability of the process.

In a further preferred variant, after the final cutting-free operation, the workpiece cut-out is removed from the workpiece by gravity or by the application of suction. Both methods allow rapid and reliable removal of workpiece cut-outs that have been cut free, it being possible for continuous operation of the machine tool to be ensured in contrast to manual removal of the cut-outs.

The invention also features a method for creating a processing program for operating the control unit of the above-described machine tool, in which method control commands are generated which, during running of the processing program on the control unit, bring about a switch from the first processing mode to the second processing mode. A processing program of that kind may be created, for example, by providing, in a first program segment of the processing program, control commands that cause both movement of the processing tool and movement of the workpiece, and providing, in a second program segment, only control commands that trigger movement of the processing tool alone. That is to say, in the second segment no control commands for movement of the workpiece are provided.

In one advantageous variant, to bring about the switch from the first processing mode to the second processing mode, a switching control command is generated which is inserted into a sequence of control commands of the processing program. The switching control command causes a change in the execution of the control commands of the processing program by the control unit. Control commands specifying a target position that are processed by the control unit before the switching control command are executed by movement of both the processing tool and the workpiece. Control commands specifying a target position that are processed after the switching control command, on the other hand, are executed by movement of the processing tool alone. It will be appreciated that by inserting a further switching control command, a switch from the second to the first processing mode may also be made possible.

In an especially preferred variant, the switching control command is inserted into the sequence of control commands before a control command for final cutting-free of a workpiece cut-out from the workpiece. In that manner, as already explained above, the final cutting-free operation may take place by movement of the processing tool alone, whereby the reliability in the cutting process may be increased.

The invention also features a computer program for performing the method for creating a processing program as described above. The computer program creates the processing program in this case on the basis of the number, shape and size of the workpiece cut-outs that are to be obtained by processing of the workpiece, which information is specified by a user by means of a suitable user interface. The processing program may be created long before the processing of the workpiece and may be communicated to the control unit by means of a computer-readable medium or by means of another form of data transmission only immediately prior to processing.

The invention also features a computer-readable medium having encoded thereon software for operating a control unit of a machine tool, the software comprising instructions for causing the control unit to switch between a first processing mode, in which the processing tool and the workpiece both move along the axis, and a second processing mode, in which the processing tool moves along the axis and the workpiece remains stationary.

In some implementations, the software further comprises cutting instructions for causing at least one of cutting-free of a workpiece cut-out and cutting-out of a workpiece cut-out, and wherein the switching instructions are executed before the cutting instructions. The software may also include instructions for recognizing that a length of a residual connection of a workpiece cut-out to a workpiece is less than a threshold length, and causing execution of the switching instructions in response to the recognition. In some cases, the software includes instructions for recognizing that a length of a residual connection of a workpiece cut-out to a workpiece is too short to allow further movement of the workpiece, wherein, in response to the recognition, the switching instructions cause execution of the second processing mode.

In yet a further aspect, the invention features a computer-readable medium having encoded thereon software for operating a control unit of a machine tool, the software comprising (a) first instructions for executing a first processing mode in which a processing tool and a workpiece move along the axis; (b) second instructions for executing a second processing mode in which the processing tool moves along the axis and the workpiece remains stationary; and (c) switching instructions for causing the machine tool to switch between the first and second processing modes.

The details of one or more embodiments of the invention are set forth in the accompanying drawings and the description below. Other features and advantages of the invention will be apparent from the description and drawings, and from the claims.

DETAILED DESCRIPTION

Figure 1:
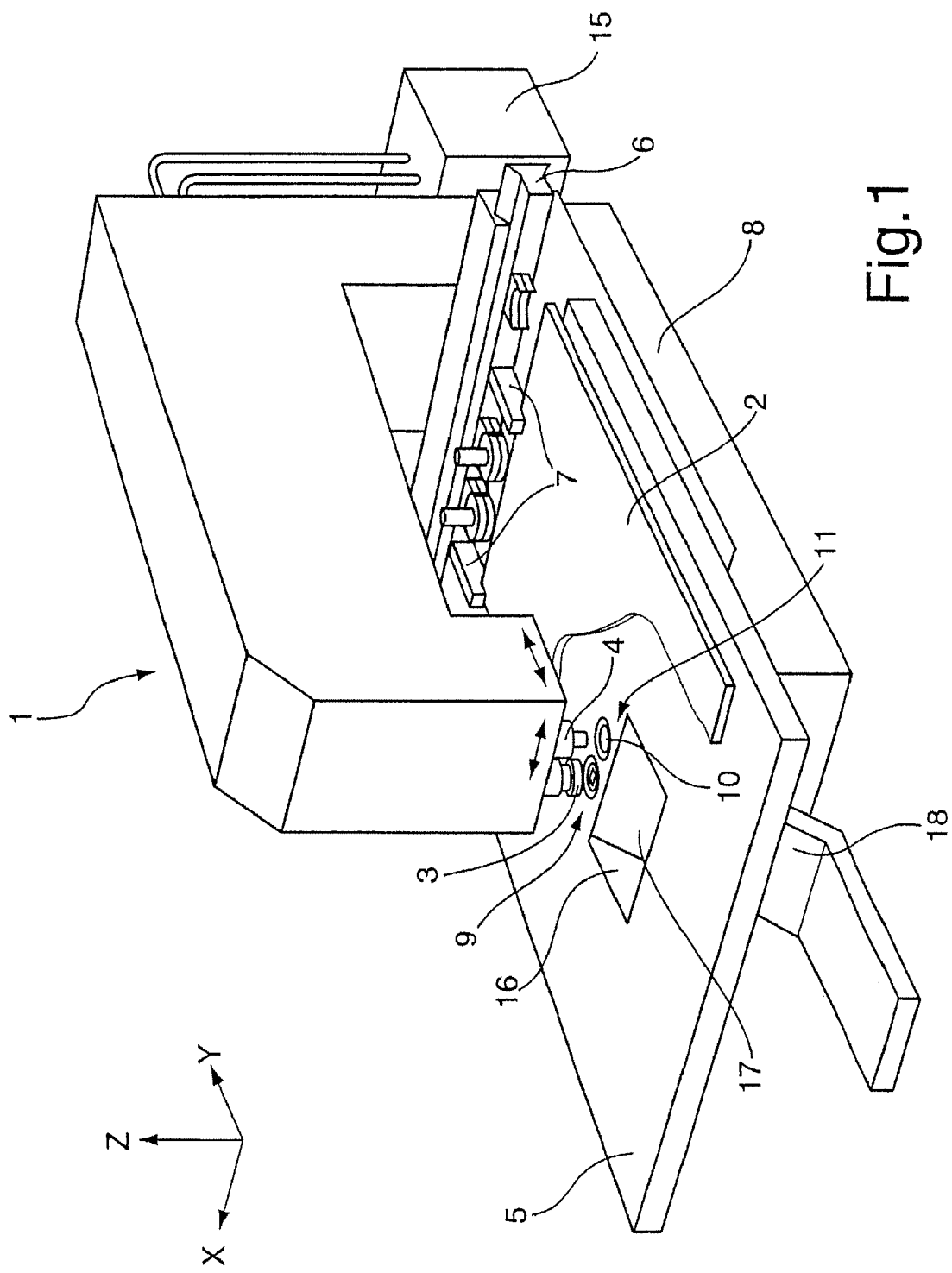
FIG. 1 is a schematic illustration of an embodiment of a machine tool according to the invention.

FIG. 1 shows a machine tool 1 in the form of a laser punch press. The machine tool 1 includes a conventional punch forming device 3, and a laser processing head 4 for processing a metal sheet serving as the workpiece 2. The workpiece 2 to be processed is supported during workpiece processing on a workpiece table 5. By means of a conventional holding device 6, which has clamps 7 for gripping the workpiece 2, the workpiece 2 may be displaced relative to the stationary punch forming device 3 and the laser processing head 4 along a first movement axis X of the plane of the metal sheet (X-Y plane of an XYZ coordinate system). The workpiece 2 may be moved along a second movement axis Y of the plane of metal sheet by displacement of the workpiece table 5 together with the holding device 6 relative to a base support 8, on which the workpiece table 5 is supported, by means of a conventional coordinate guide (not shown).

The workpiece 2 may accordingly be displaced along the first and second movement axes X, Y, relative to the punch forming device 3 and the laser processing head 4. This allows the particular region of the workpiece 2 to be processed to be brought into a processing region 9 of the punch forming device 3 and/or into a processing region 11 of the laser processing head 4, which region 11 is delimited by a substantially circular aperture 10 in the workpiece table 5. In contrast to the stationary punch forming device 3, the laser processing head 4 is displaceable within the processing region 11, along the first and second movement axes X, Y, by means of a movement unit (not shown), as is indicated in FIG. 1 by two double-headed arrows. Furthermore, the laser processing head 4 may also be displaced along a third movement axis Z in order to set a suitable focus position for processing of the metal sheet.

Figure 2A:
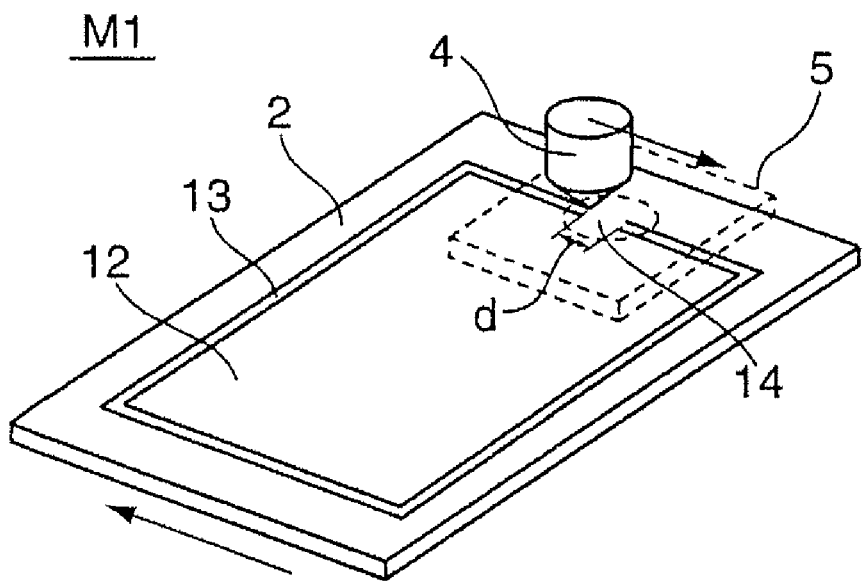
FIGS. 2a and 2b are schematic illustrations of a workpiece during processing in a first processing mode (FIG. 2a) and in a second processing mode (FIG. 2b) of the machine tool of FIG. 1.
Figure 2B:
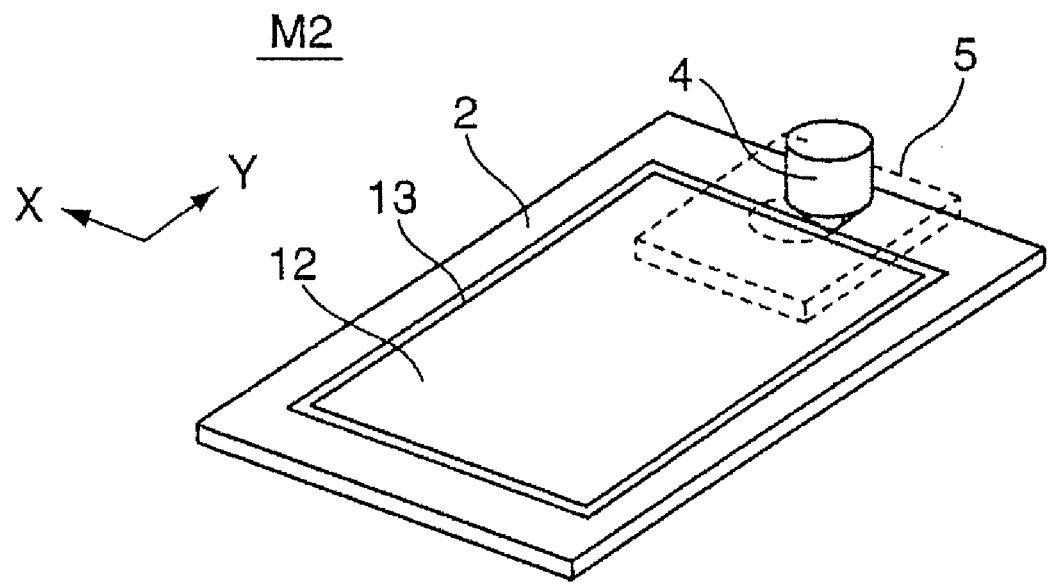

Once the region of the workpiece that is to be processed has been brought into the processing region 11 of the laser processing head 4, the latter is activated ("beam on") in order to cut from the workpiece 2 a workpiece cut-out 12 of, for example, rectangular shape, as shown in FIG. 2. During initial cutting, in a first processing mode (M1, FIG. 2a) of the machine tool 1, the workpiece cut-out 12 is cut partially free, with the workpiece 2 and the laser processing head 4 being moved at the same time, producing a cut slit 13. Shortly before the final cutting-free operation, the laser processing head 4 and the workpiece 2 are in this case moved in opposite directions along the first movement axis X, as indicated by the arrows in FIG. 2a, whereby the metal sheet 2 is cut free except for a residual connection 14. In the first processing mode M1, therefore, superposed movement takes place, in which rapid processing of the metal sheet 2 may be achieved by the combined movement of both the workpiece 2 and the laser processing head 4 along the common, first movement axis X. It will be appreciated that, where appropriate, a third processing mode may also be provided, which is executed before the first processing mode M1, for example, and in which the workpiece 2 alone is moved, while the laser processing head 4 is at rest. For cutting-free of a workpiece cut-out 12 oriented other than as shown in FIG. 2a, it is, of course, also possible for an additional movement of the workpiece 2 and/or of the laser processing head 4 to take place along the second movement axis Y.

As soon as the residual connection 14 becomes less than a length d, there is a danger that, as the workpiece 2 moves, the workpiece cut-out 12 will move relative thereto, and in particular will execute a rotational movement about the residual connection 14 in the plane of the metal sheet. The length d depends on the size and weight of the workpiece cut-out 12 and of the workpiece 2 and on the configuration of the movement units of the machine tool 1. This problem is aggravated owing to the friction that exists if, as in the present case, the workpiece 2 is being moved along the first movement axis relative to the workpiece table 5. For that reason, in a second processing mode (M2, cf. FIG. 2b), which follows the first processing mode M1 with a seamless transition, the laser processing head 4 alone is moved in order for the workpiece cut-out 12 to be finally cut free at the residual connection 14 while the workpiece 2 is at rest.

In the worst case, relative movement between workpiece cut-out 12 and workpiece 2 may result in the workpiece cut-out 12 passing under the workpiece and becoming wedged there and thus becoming incapable of being removed from the workpiece 2. Even when there is only slight twisting of the workpiece cut-out 12 relative to the workpiece 2, however, the cut slit 13 generally no longer has a constant width after the final cutting-free operation. In the present case, that is, under typical operating conditions, relative movement between workpiece cut-out 12 and workpiece 2 generally occurs at a length of the residual connection 14 of less than about 40 mm. That length can be processed by the laser processing head 4 alone without any difficulty, since its processing region 11 has a diameter of about 50 mm. It will be appreciated that the length d of the residual connection 14 may vary according to the particular application, for example in some implementations the length d varies between values of 30 and 50 mm, and in some cases even between 20 and 60 mm. The length d of the residual connection is therefore a parameter that can be given as a specification to the machine tool from the outside, depending on the application.

After the switch from the first to the second processing mode, the control unit 15 may initiate further measures in order for the workpiece 2 to be fixed in position by means of handling devices, not shown, such as, for example, by means of a suction frame. Since the final cutting-free operation is performed on the workpiece 2 when it is at rest, the workpiece cut-outs that are to be cut free may already have been fixed to the handling device beforehand. For example, in this case suction devices of a suction frame may be applied to the workpiece cut-out to be cut free immediately before the final cutting-off cut, with the result that reliable removal from the machine tool 1 is also ensured.

For selection of the suitable processing mode, the machine tool 1 has a control unit 15 which is shown in FIG. 1. The control unit 15 is used for numerical control of the machine tool by executing a processing program. The processing program may be previously created by a user on a data-processing system specifically equipped for the purpose, by means of the user providing all relevant variables, in particular the number and geometry of the workpiece cut-outs 12 to be cut free from the workpiece 2, via a user interface of the data-processing system. A computer program running on the data-processing system creates from those specifications the processing program, which essentially consists of a sequence of control commands for coordinating the movements of movement units, not shown, of the laser processing head 4 and of the coordinate guide of the workpiece table 5 and the holding device 6, to which movement units the control unit 15 is connected.

To switch from the first processing mode M1 to the second processing mode M2, when the program is being created a particular control command, for example "MODE Slave" is generated, whereby the control unit 15 executes subsequent control commands specifying a target position exclusively by moving the laser processing head 4. Once final cutting-free has been completed, a subsequent control command in the processing program ("beam off") is executed to deactivate the laser processing head 4. As a result of the laser beam being switched off, a switch is made from the second processing mode M2 to an operating mode of the machine tool 1 in which the workpiece 2 is positioned with a further region to be processed in the processing region 9 of the punch forming device 3 or in the processing region 11 of the laser processing head 4, for which only the workpiece 2 is moved ("MODE Master"). During processing of the workpiece 2 by the punch forming device 3, the workpiece 2 remains in the position set by the positioning operation. For laser processing of the workpiece 2, after positioning, the laser processing head 4 is reactivated, whereby a switch is made from the operating mode for positioning of the workpiece 2 to a processing mode. Immediately before or after activation of the laser processing head 4, a further particular control command of the processing program is executed, for example "MODE Master/Slave", whereby the control unit executes subsequent control commands specifying a target position by moving both the laser processing head 4 and the workpiece 2. The machine tool 1 is thus operated in the first processing mode M1 again and the processing operation described above may begin anew at a different region of the workpiece 2.

For removal of the workpiece cut-outs from the workpiece 2 after the final cutting-free operation, there is provided in the workpiece table 5 a rectangular aperture 16 which can be opened and closed by a movable flap 17 shown in the open state in FIG. 1. Prior to the final cutting-free operation, the workpiece 2 is positioned in such a manner that the workpiece cut-out 12 of FIG. 2 that has been partially cut free comes to lie over the aperture 16 closed by the flap 17. After the final cutting-free operation, the flap 17 is opened and the workpiece cut-out 12 that has been cut completely free falls by gravity through the aperture 16 onto a chute 18 where it is removed from the working region of the machine tool 1.

As an alternative to discharging via the chute 18, it is also possible for the workpiece cut-outs to be taken away—as explained above—by means of a suction frame. In addition, waste pieces of small dimensions produced during the cutting-free operation may also be discharged via the circular aperture 10 which delimits the processing region 11 of the laser processing head 4.

To summarize, by means of the machine tool described above and the associated method, workpiece processing can be speedily carried out in the first processing mode whilst, at the same time, by switching to the second processing mode at the right time, high reliability of the process may be ensured. It will be appreciated that, in addition to the machine tool shown herein, in which both the workpiece and the processing tool are movable along two movement axes, the above procedure may also be used to advantage on machine tools in which superposed movement of workpiece and processing tool takes place only in one direction. Furthermore, it may be advantageous for two or more workpiece cut-outs to be partially cut free from the workpiece in such a manner that they may be finally cut free together by means of a single processing step in the second processing mode.

A number of embodiments of the invention have been described. Nevertheless, it will be understood that various modifications may be made without departing from the spirit and scope of the invention. Accordingly, other embodiments are within the scope of the following claims.

What is claimed is:

1. A machine tool for processing a workpiece comprising:
   a processing tool, the processing tool being movable relative to the workpiece and the workpiece being movable relative to the processing tool along a common movement axis, and
   a control unit configured to selectively actuate the processing tool and the workpiece so that, in a first processing mode both the processing tool and the workpiece are moved along the common movement axis for cutting a slit between the workpiece and a workpiece cut-out, and, in a second processing mode, the processing tool alone is moved along the common movement axis for cutting the workpiece cut-out free from the workpiece at a residual connection which has been left by partial cutting during the first processing mode,
   wherein the control unit is configured to switch, during processing of the workpiece, from the first processing mode to the second processing mode when a length of the residual connection is too small to prevent relative movement between the workpiece cut-out and the workpiece.

2. A machine tool according to claim 1, further comprising a suction device configured to apply suction to the workpiece in the second processing mode.

3. A machine tool according to claim 1, further comprising a workpiece table configured to move the workpiece.

4. A machine tool according to claim 3, wherein at least one aperture for removal of cut-off workpiece cut-outs is provided in the workpiece table.

5. A machine tool according to claim 4, wherein the workpiece comprises a movable element configured to close the aperture.

6. A machine tool according to claim 1, wherein the processing tool comprises a laser processing head.

7. A machine tool according to claim 1, wherein the control unit is configured so that in a third processing mode the workpiece alone is moved.

8. A machine tool according to claim 1, wherein a movement region of the processing tool is smaller than a movement region of the workpiece.

9. A method for processing a workpiece, the method comprising:
   providing a processing tool that is movable relative to the workpiece, and providing a support configured to move the workpiece relative to the processing tool, the movement of the processing tool and the movement of the workpiece being along a common movement axis,
   processing the workpiece,
   during processing, selectively actuating movement of the processing tool and the workpiece in such a manner that a portion of the processing of the workpiece takes place in a first processing mode, in which both the processing tool and the workpiece are moved along the common movement axis for cutting a slit between the workpiece and a workpiece cut-out, and a portion of the processing of the workpiece takes place in a second processing mode, in which the processing tool alone is moved along the common movement axis for cutting the workpiece cut-out free from the workpiece at a residual connection which has been left by partial cutting during the first processing mode, and
   switching, during processing of the workpiece, from the first processing mode to the second processing mode when a length of the residual connection is too small to prevent relative movement between the workpiece cut-out and the workpiece.

10. A method according to claim 9, wherein selectively actuating movement comprises, before a final cutting-free of a workpiece cut-out from the workpiece, switching from the first processing mode to the second processing mode.

11. A method according to claim 9, wherein switching from the first processing mode to the second processing mode is performed as soon as the length of the residual connection becomes less than 40 mm.

12. A method according to claim 9, further comprising fixing the workpiece in position before the cutting-free operation.

13. A method according to claim 9, wherein, after the cutting-free operation, the workpiece cut-out is removed from the workpiece by gravity or by application of suction.

14. A computer-readable medium having encoded thereon software for operating a control unit of a machine tool, the software comprising switching instructions for causing the control unit to switch between a first processing mode, in which a processing tool and a workpiece both move along a common axis for cutting a slit between the workpiece and a workpiece cut-out, and a second processing mode, in which the processing tool moves along the common axis and the workpiece remains stationary for cutting the workpiece cut-out free from the workpiece at a residual connection which has been left by partial cutting during the first processing mode, wherein the switching instructions are implemented when a length of the residual connection is too small to prevent relative movement between the workpiece cut-out and the workpiece.

15. A computer-readable medium according to claim 14, wherein the software further comprises cutting instructions for causing at least one of cutting-free of a workpiece cut-out and cutting-out of a workpiece cut-out, and wherein the switching instructions are executed before the cutting instructions.

16. The computer-readable medium of claim 14, wherein the software further comprises instructions for recognizing that a length of a residual connection of a workpiece cut-out to a workpiece is less than a threshold length, and causing execution of the switching instructions in response to the recognition.

17. The computer-readable medium of claim 14, wherein the software further comprises instructions for recognizing that a length of a residual connection of a workpiece cut-out to a workpiece is too short to allow further movement of the workpiece, and wherein, when the control unit recognizes that a specific length of the residual connection has been reached, the switching instructions cause execution of the second processing mode.

18. A computer-readable medium having encoded thereon software for operating a control unit of a machine tool, the software comprising
   first instructions for executing a first processing mode in which a processing tool and a workpiece move along a common axis for cutting a slit between the workpiece and a workpiece cut-out;
   second instructions for executing a second processing mode in which the processing tool moves along the common axis and the workpiece remains stationary for cutting the workpiece cut-out free from the workpiece at a residual connection which has been left by partial cutting during the first processing mode; and
   switching instructions for causing the machine tool to switch between the first and second processing modes when a length of the residual connection is too small to prevent relative movement between the workpiece cut-out and the workpiece.

* * * * *

UNITED STATES PATENT AND TRADEMARK OFFICE
CERTIFICATE OF CORRECTION

| | | |
|---|---|---|
| PATENT NO. | : 7,899,575 B2 | Page 1 of 1 |
| APPLICATION NO. | : 12/145717 | |
| DATED | : March 1, 2011 | |
| INVENTOR(S) | : Friedrich Kilian, Frank Schmauder and Dieter Pfisterer | |

It is certified that error appears in the above-identified patent and that said Letters Patent is hereby corrected as shown below:

Title page, item [75] Column 1, after Friedrich Kilian delete "Leonberg/Gebershelm" and insert --Leonberg/Gebersheim--.

Signed and Sealed this
Ninth Day of August, 2011

David J. Kappos
*Director of the United States Patent and Trademark Office*